United States Patent
Rusert

(10) Patent No.: US 10,609,394 B2
(45) Date of Patent: Mar. 31, 2020

(54) ENCODING AND DERIVING PARAMETERS FOR CODED MULTI-LAYER VIDEO SEQUENCES

(71) Applicant: Telefonaktiebolaget L M Ericsson (publ), Stockholm (SE)

(72) Inventor: Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 621 days.

(21) Appl. No.: 14/395,563

(22) PCT Filed: Apr. 23, 2013

(86) PCT No.: PCT/SE2013/050433
§ 371 (c)(1),
(2) Date: Oct. 20, 2014

(87) PCT Pub. No.: WO2013/162450
PCT Pub. Date: Oct. 31, 2013

(65) Prior Publication Data
US 2015/0334407 A1    Nov. 19, 2015

Related U.S. Application Data

(60) Provisional application No. 61/637,368, filed on Apr. 24, 2012.

(51) Int. Cl.
*H04N 19/184* (2014.01)
*H04N 19/30* (2014.01)
(Continued)

(52) U.S. Cl.
CPC ........... *H04N 19/184* (2014.11); *H04N 19/30* (2014.11); *H04N 19/463* (2014.11); *H04N 19/70* (2014.11)

(58) Field of Classification Search
CPC ...... H04N 19/30; H04N 19/82; H04N 7/0125; H04N 7/0137; H04N 7/0145; H04N 19/46;
(Continued)

(56) References Cited

U.S. PATENT DOCUMENTS

| | | | | |
|---|---|---|---|---|
| 7,983,904 B2 * | 7/2011 | Ehara | ...................... | G10L 19/24 704/205 |
| 8,036,904 B2 * | 10/2011 | Myburg | .................. | G10L 19/24 704/200 |

(Continued)

OTHER PUBLICATIONS

European Office Action—Communication pursuant to Article 94(3) EPC corresponding to European Patent Application No. 13 723 269.0 (7 pages) (dated Apr. 29, 2016).

(Continued)

*Primary Examiner* — Dave Czekaj
*Assistant Examiner* — Kehinde Abimbola
(74) *Attorney, Agent, or Firm* — Sage Patent Group

(57) ABSTRACT

A method of deriving parameters required for decoding a current layer of a coded multi-layer video sequence. The method comprises deriving a required parameter from one or more parameters associated with the current or a lower layer of the multiple layers. The invention makes use of an understanding that parameters which are required for decoding a current higher layer of a multi-layer video representation may be derived, i.e., inferred or predicted, from parameters associated with lower layers rather than explicitly signaled in a parameter set associated with the current layer. Also disclosed are a method of encoding parameters associated with such a current layer, corresponding computer program products, a corresponding parameter set decoder, and a corresponding parameter set encoder.

20 Claims, 4 Drawing Sheets

(51) Int. Cl.
*H04N 19/70* (2014.01)
*H04N 19/463* (2014.01)

(58) Field of Classification Search
CPC ...... H04N 19/86; H04N 19/70; H04N 19/187;
H04N 19/105; H04N 19/172; H04N 19/33; H04N 19/59; H04N 19/44; H04N 19/159; H04N 19/176; H04N 19/593; H04N 19/61; H04N 19/157; H04N 19/11; H04N 19/597; H04N 19/463; H04N 19/503; H04N 19/174; H04N 19/184; H04N 19/117; H04N 19/80; H04N 19/107; H04N 19/13; H04N 19/51; H04N 19/615; H04N 19/63; H04N 19/196
See application file for complete search history.

(56) References Cited

U.S. PATENT DOCUMENTS

| | | | | |
|---|---|---|---|---|
| 8,560,328 | B2* | 10/2013 | Yamanashi | G10L 21/038 704/200.1 |
| 8,938,004 | B2* | 1/2015 | Boyce | H04N 19/30 375/240.12 |
| 9,451,252 | B2* | 9/2016 | Chen | H04N 19/70 |
| 2005/0123055 | A1* | 6/2005 | Winger | H04N 21/235 375/240.25 |
| 2007/0086516 | A1 | 4/2007 | Lee et al. | |
| 2007/0286283 | A1* | 12/2007 | Yin | H04N 19/70 375/240.16 |
| 2008/0089411 | A1* | 4/2008 | Wenger | H04N 19/105 375/240.12 |
| 2008/0095228 | A1* | 4/2008 | Hannuksela | H04N 19/70 375/240.01 |
| 2008/0126082 | A1* | 5/2008 | Ehara | G10L 21/038 704/205 |
| 2008/0195397 | A1* | 8/2008 | Myburg | G10L 19/24 704/500 |
| 2009/0080535 | A1* | 3/2009 | Yin | H04N 19/63 375/240.26 |
| 2009/0207919 | A1* | 8/2009 | Yin | H04N 19/63 375/240.25 |
| 2010/0017198 | A1* | 1/2010 | Yamanashi | G10L 19/24 704/205 |
| 2010/0067581 | A1 | 3/2010 | Hong et al. | |
| 2010/0208810 | A1* | 8/2010 | Yin | H04N 19/105 375/240.12 |
| 2012/0063691 | A1 | 3/2012 | Yu et al. | |
| 2012/0183076 | A1* | 7/2012 | Boyce | H04N 19/105 375/240.25 |
| 2012/0221344 | A1* | 8/2012 | Yamanashi | G10L 19/0204 704/500 |
| 2012/0230409 | A1* | 9/2012 | Chen | H04N 19/105 375/240.15 |
| 2012/0230431 | A1* | 9/2012 | Boyce | H04N 19/70 375/240.25 |
| 2012/0230432 | A1* | 9/2012 | Boyce | H04N 21/23432 375/240.25 |
| 2013/0016776 | A1* | 1/2013 | Boyce | H04N 19/30 375/240.06 |
| 2013/0028316 | A1* | 1/2013 | Leontaris | H04N 19/597 375/240.03 |
| 2013/0182755 | A1* | 7/2013 | Chen | H04N 19/70 375/240.01 |
| 2013/0222539 | A1* | 8/2013 | Pahalawatta | H04N 13/0048 348/43 |
| 2013/0266059 | A1* | 10/2013 | Chong | H04N 19/46 375/240.02 |
| 2013/0266077 | A1* | 10/2013 | Boyce | H04N 19/70 375/240.25 |
| 2014/0050267 | A1* | 2/2014 | Sakurai et al. | H04N 19/70 375/240.01 |
| 2014/0355693 | A1* | 12/2014 | Chen | H04N 19/597 375/240.26 |

OTHER PUBLICATIONS

International Search Report for International Application No. PCT/SE2013/050433 dated Jul. 23, 2013, 3 pages.
Written Opinion of the International Searching Authority for International Application No. PCT/SE2013/050433 dated Jul. 23, 2013, 8 pages.
Rusert: "High-level syntax for 3D and scalable extensions: Signaling of layer identifiers and inter-layer decoding dependencies", 9. JCT-VC Meeting; 100. MPEG Meeting; Apr. 27, 2012-Jul. 5, 2012; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-I0536, Apr. 26, 2012; 8 pages.
Zhu, L., et al., "SVC Hypothetical Reference Decoder," 22. JVT Meeting; 79. MPEG Meeting; Jan. 13, 2007-Jan. 20, 2007; Marrakech, MA (Joint Video Team of ISO/IEC JTC1/SC29/SG11 and ITU-T SG.16) No. JVT-V068, Jan. 21, 2007 (Jan. 21, 2007), XP030006876, ISSN: 0000-0156, 10 pages.
European Office Action—Communication Pursuant to Article 94(3) EPC corresponding to European Patent Application No. 13 723 269.0 (7 pages) (dated Aug. 30, 2017).
Communication pursuant to Article 94(3) EPC for related EP Application No. 13 723 269.0-1208; dated Apr. 20, 2018; pp. 2.
Case Annex of Communication pursuant to Article 94(3) EPC for related EP Application No. 13 723 269.0-1208; dated Apr. 20, 2018; pp. 47.
Annex of Communication pursuant to Article 94(3) EPC for related EP Application No. 13 723 269.0-1208; dated Apr. 20, 2018; pp. 9.

* cited by examiner

ENCODING AND DERIVING PARAMETERS FOR CODED MULTI-LAYER VIDEO SEQUENCES

CROSS REFERENCE TO RELATED APPLICATION

This application is a 35 U.S.C. § 371 national stage application of PCT International Application No. PCT/SE2013/050433, filed on 23 Apr. 2013, which itself claims the benefit of U.S. provisional Patent Application No. 61/637,368, filed 24 Apr. 2012, the disclosures and contents of both of which are incorporated by reference herein in their entirety. The above-referenced PCT International Application was published in the English language as International Publication No. WO 2013/162450 A1 on 31 Oct. 2013.

TECHNICAL FIELD

The invention relates to a method of deriving parameters required for decoding a current layer of a coded video sequence comprising multiple layers, a method of encoding parameters associated with such a layer, corresponding computer programs and computer program products, a parameter set decoder for deriving parameters required for decoding a current layer of a coded video sequence comprising multiple layers, and a parameter set encoder for encoding parameters associated with such a layer.

BACKGROUND

High Efficiency Video Coding (HEVC) is a next generation video coding standard which is currently under standardization. HEVC aims to substantially improve coding efficiency compared to state-of-the-art video coding, such as H.264/AVC (also known as MPEG-4 AVC), in particular for high resolution video content.

The initial focus of the HEVC standardization is on mono video, i.e., one camera view. However, given the relevance of multi-resolution and multi-view 3D representations, extensions towards scalable coding and multi-view video as well as depth-map coding are planned or ongoing. Those extensions require multi-layer support.

An HEVC bitstream without extensions can be considered as a single-layer bitstream, i.e., it represents the video in a single representation, e.g., as a single view with single resolution and single quality. In multi-layer extensions, an HEVC single-layer bitstream is typically included as a "base layer". In multi-view 3D extensions, additional layers may represent additional video views, captured from different camera positions, depth information, or other information. In scalability extensions, additional layers may represent the video in additional, higher, video picture resolutions, higher pixel fidelity, alternative color-spaces, or alike, providing improved video quality in comparison to the base layer.

HEVC uses a video packetization concept denoted as Network Abstraction Layer (NAL) unit concept. A compressed video bitstream consists of a sequence of NAL units, representing a coded video sequence. Each NAL unit can carry coded video data, so called Video Coding Layer (VCL) data, or parameter data needed for decoding, so called Parameter Sets (PS), or supplementary data, so called Supplementary Enhancement Information (SEI). Each NAL unit consists of a NAL unit header and a NAL unit payload. The NAL unit header consists of a set of identifiers that can be used by networks to manage the compressed bit streams. For example, in order to reduce the transmission bitrate of a video in case of limited bandwidth in the network, some NAL units can be discarded based on information carried in the NAL unit headers such as to minimize the quality degradation caused by discarding. This process is referred to as "bitstream thinning".

Parameter sets are syntax structures containing parameters needed in the decoding process, such as the decoder profile (i.e., the mode of operation specifying the supported decoding algorithms) and level (specifying implementation limits such as maximum supported picture size, frame rate, and bit rate), the video picture dimensions (width and height of the video picture), and parameters related to configuration of algorithms and settings which are necessary for decoding the compressed bitstream. Several different types of parameter sets exist, in particular Sequence Parameter Sets (SPS), Picture Parameter Sets (PPS), and Adaptation Parameter Sets (APS). Introduction of a further parameter set, the Video Parameter Set (VPS), has been considered.

The SPS contains parameters that change very infrequently and are typically valid for a complete video sequence. The PPS contains parameters that may change more frequently than SPS parameters, but typically not very frequently. The APS contains information that typically changes frequently, e.g., with every coded picture. In the envisioned scalability and 3D extensions to HEVC, it is likely that these PS concepts will be re-used, and PSs will be present in different layers. In that context, the VPS has been proposed to contain information which applies identically to several or all layers and changes infrequently. Parameter sets typically have an identifier (PS ID) by which they can be referred to. Further parameter sets, such as Group Parameter Sets (GPS), are under discussion.

In the HEVC decoding process, PSs are "activated" when they are referred to by NAL units that contain coded slices, i.e., coded video data. When a PS is active, the values of syntax elements, i.e., parameters comprised in the PS are accessible by the decoder in the decoding process. The known activation mechanisms for PSs are outlined in the following:

A PPS which is referenced in a slice header, i.e., by a parameter field in a coded slice, is activated when the coded slice is decoded. Zero or one PPS can be active at each time.

SPSs are referenced by PPSs. When a PPS is activated the referenced SPS is activated, too. Zero or one SPS can be active at a time.

APSs which are referenced in a slice header are activated when the slice is decoded, similar to PPSs.

A VPS (not in the current HEVC draft, but under discussion) is activated when an SPS comprising a reference to the VPS is activated.

Alternatively, a GPS, which has been proposed, would replace the activation processes for APS, PPS, and SPS. A GPS would be activated if a slice having a reference to the GPS in its header is decoded. The GPS may include references to a PPS, SPS, zero, one, or several APS, and potentially a VPS. When the GPS is activated, other PSs referenced in the GPS may be activated, too.

In the HEVC 3D extension test model under consideration in the Moving Picture Experts Group (MPEG), several video and depth views can be included in a coded video sequence, or bitstream, where each video and depth view is associated with a separate SPS. Thus, for the case of a 2-view (3-view) video and depth representation, a total of four (six) SPSs need to be sent for each random access point, i.e., a point in the bitstream where decoding typically starts. The SPSs associated with the different video and depth views have a high similarity, since the video dimensions are identical and typically the same or almost the same set of coding algorithms is used across views. By duplicating this information in several SPSs, unnecessary redundancy is introduced, amounting to typically around 100 or several 100 bits per SPS.

One approach for reducing redundancy, and thereby overhead, in signaling parameter sets, is to re-use parameter sets, such as SPSs, in several layers. The effectiveness of such approach is however limited since, even though many SPS syntax elements typically have identical values across layers, some SPS syntax elements still have different values, e.g., the syntax elements profile_idc and level_idc, which indicate the decoder profile and level, respectively. For a 2-view video and depth representation, it is likely that at least three different profiles will be signaled, e.g., an HEVC main profile associated with the base video view (i.e., the base layer), a stereoscopic 3D profile associated with the base view and enhancement video views, and a 2-view video and depth 3D profile, each of them being associated with a different value of profile_idc. Similarly, for 3-view video and depth representations, it may be desirable to include the abovementioned three profiles in order to support mono-capable (i.e., single-layer video) decoders, stereo-capable (video only, as well as and video and depth) decoders, and to add at least one additional profile for 3-view video and depth. Thus a total of at least four different values of profile_idc have to be signaled. Even if it is not necessary to signal a new profile with each layer, it may be desirable to signal different level requirements for the different layers. For the same reasons, it is likely that spatial and/or fidelity scalability extensions will associate different profiles and/or levels with the different layers, with many SPS syntax elements being identical across layers while others not. Thus, even when re-using SPSs across layers, redundancy will remain.

SUMMARY

It is an object of the invention to provide an improved alternative to the above techniques and prior art.

More specifically, it is an object of the invention to provide an improved way of signaling parameter sets in HEVC multi-layer extensions.

These and other objects of the invention are achieved by means of different aspects of the invention, as defined by the independent claims. Embodiments of the invention are characterized by the dependent claims.

For the purpose of elucidating the invention, it is assumed that layers of a multi-layer video representation have a hierarchical relationship such that the lowest layer (layer_id=0) is the base layer and higher layers (layer_id>0) improve the quality of the video or add features, e.g., the number of views. Further, a layer N may have decoding dependencies with respect to lower layers N−1, N−2, . . . , 0, but not with respect to higher layers, i.e., N+1 or higher. Thus, a bitstream structure is assumed which allows NAL units associated with layers higher than layer N to be removed from a compressed bitstream while still allowing layer N and all layers below to be decoded without errors.

According to a first aspect of the invention, a method of deriving parameters required for decoding a current layer of a coded video sequence, or bitstream, comprising multiple layers, is provided. The method comprises deriving a required parameter from one or more parameters which are associated with the current layer or a lower layer of the multiple layers.

According to a second aspect of the invention, a computer program is provided. The computer program comprises computer program code which is adapted, if executed on a processor, to implement the method according to the first aspect of the invention.

According to a third aspect of the invention, a computer program product is provided. The computer program product comprises a computer readable storage medium. The computer readable storage medium has the computer program according to the second aspect of the invention embodied therein.

According to a fourth aspect of the invention, a method of encoding parameters associated with a current layer of a coded video sequence, or bitstream, comprising multiple layers, is provided. The method comprises obtaining a plurality of parameters to be signaled in a parameter set associated with the current layer, using a reference to a lower layer of the multiple layers or to a parameter set associated with the lower layer for determining a set of parameters associated with the lower layer, determining one or more of the plurality of parameters to be signaled which are predictable from the set of parameters associated with the lower layer, and encoding the plurality of parameters to be signaled into the parameter set associated with the current layer. In the step of encoding the parameter set associated with the current layer, parameters which are not predictable are explicitly encoded into the parameter set associated with the current layer. Further, parameters which are predictable from a first parameter of the set of parameters associated with the lower layer alone are omitted in the encoding process, i.e., they are not encoded into the parameter set associated with the current layer. Finally, for parameters which are predictable from a sum of the first parameter and a second parameter, the second parameter is encoded into the parameter set associated with the current layer.

According to a fifth aspect of the invention, a computer program is provided. The computer program comprises computer program code which is adapted, if executed on a processor, to implement the method according to the fourth aspect of the invention.

According to a sixth aspect of the invention, a computer program product is provided. The computer program product comprises a computer readable storage medium. The computer readable storage medium has the computer program according to the fifth aspect of the invention embodied therein According to a seventh aspect of the invention, a parameter set decoder for deriving parameters required for decoding a current layer of a coded video sequence, or bitstream, comprising multiple layers, is provided. The decoder is arranged for deriving a required parameter from one or more parameters associated with the current or a lower layer of the multiple layers.

According to an eighth aspect of the invention, a parameter set encoder for encoding parameters associated with a current layer of a coded video sequence, or bitstream, comprising multiple layers, is provided. The encoder is arranged for obtaining a plurality of parameters to be signaled in a parameter set associated with the current layer, using a reference to a lower layer of the multiple layers or to a parameter set associated with the lower layer for determining a set of parameters associated with the lower layer, determining one or more of the plurality of parameters to be signaled which are predictable from the set of parameters associated with the lower layer, and encoding the plurality of parameters to be signaled into the parameter set associated with the current layer. The encoder is further arranged for explicitly encoding parameters which are not predictable into the parameter set associated with the current layer, and omitting parameters which are predictable from a first parameter of the set of parameters associated with the lower layer alone in the encoding process, i.e., they are not encoded into the parameter set associated with the current layer. Finally, for parameters which are predictable from a sum of the first parameter and a second parameter, the encoder is arranged for encoding the second parameter into the parameter set associated with the current layer.

The invention makes use of an understanding that parameters which are required for decoding a current, higher, layer of a multi-layer video representation are derived, i.e., inferred or predicted, from parameters associated with lower layers rather than explicitly signaled in a parameter set associated with the current layer. In this respect, it is noted that the notions of "encoding a parameter" and "explicitly signaling a parameter" are used as synonyms throughout this disclosure. Further, unless otherwise indicated, the terms "prediction" and "inference" are used synonymously throughout this disclosure. In other words, parameters required for decoding a current layer may be provided to the decoder in three different ways. Parameters which cannot be derived, e.g., from parameters which are associated with a lower layer, the parameters are encoded into the parameter set which is associated with the current layer, e.g., an SPS, and are consequently explicitly signaled. Parameters associated with the current layer which can be derived from parameters associated with a lower layer are not encoded into the parameter set which is associated with the current layer and explicitly signaled. Rather, such parameters may be inferred or predicted from corresponding parameters which are associated with lower layers. For instance, a parameter may be inferred from a parameter which is active for a lower layer, e.g., if the same parameter is used for the current and the lower layer. This may be the case if the same value is used for all layers. Further, parameters may be predicted from a parameter which is active for a lower layer, e.g., by signaling information as to how to predict the parameter associated with the current layer or by using predetermined rules.

The method used for deriving, i.e., inferring or predicting, parameters may be dependent on a type of the current layer, e.g., whether the current layer is depth view, a video view, a spatial resolution enhancement layer, or a fidelity enhancement layer.

The invention is advantageous in that redundancy in signaling parameter sets for multi-layer HEVC extensions is reduced, thereby resulting in bit savings. In particular, this is the case for higher layer parameter sets for which some or all of the required parameters can be omitted or coded in a more efficient way, e.g., using differential coding with Variable Length Coding (VLC) of the difference.

The proposed solution is applicable to both 3D (multi-view video and/or depth) and scalable extensions of HEVC (spatial scalability or fidelity scalability) or any other multi-layer extension, where different layers (texture, depth, spatial, fidelity, or alike) are associated with different SPSs, and the SPSs associated with different layers have high similarities.

According to an embodiment of the invention, the required parameter is derived from a first parameter associated with a lower layer. The first parameter is determined based on a reference, as is described further below. The method of referencing the first parameter may depend on a type of the current layer. The required parameter may, e.g., be inferred from the first parameter, i.e., has the same value as the first parameter. This is advantageous in that redundancy is reduced and, correspondingly, bit savings are achieved.

According to an embodiment of the invention, the required parameter is derived from a sum of the first parameter and a second parameter associated with the current layer. To this end, the required parameter is calculated based on the first parameter and the second parameter, using a predetermined rule. For instance, the second parameter may, e.g., be an offset or a difference which is explicitly signaled in a parameter set associated with the current layer. Signaling an offset instead of the required parameter, i.e., employing differential coding, is advantageous in that the number of bits required for transmitting the offset is typically lower than the number of bits required for transmitting the required parameter. In this way, in particular if VLC is used, bit savings may be achieved.

According to an embodiment of the invention, the required parameter is derived from a sum of the first parameter and a predetermined second parameter. For instance, if the first parameter is a layer identifier of the next lower layer with respect to the current layer, the required parameter, which is the layer identifier of the current layer, may be derived by incrementing the layer identifier by second parameter, e.g., one. Deriving the required parameter from the first parameter, i.e., a parameter associated with a lower layer, using a predetermined second parameter is advantageous in that redundancy is reduced and, correspondingly, bit savings are achieved since the second parameter is not explicitly signaled.

According to an embodiment of the invention, a reference to the lower layer is signaled in a parameter set associated with the current layer. The reference is used for indicating a set of parameters which are available for predicting or inferring required parameters for the current layer. For instance, the parameter set associated with the current layer may comprise a syntax element indicating the layer identifier of the layer which is associated with the set of parameters which are available for deriving the required parameters.

According to an embodiment of the invention, a reference to a parameter set associated with the lower layer is signaled in a parameter set associated with the current layer. This is an alternative solution for indicating a set of parameters which are available for predicting or inferring required parameters for the current layer. Rather than indicating a lower layer the parameter set associated with the current layer comprises a syntax element indicating the parameter set identifier of the parameter set which comprises the set of parameters which are available for deriving the required parameters.

According to an embodiment of the invention, the method further comprises obtaining the reference, and encoding the reference into the parameter set associated with the current layer. This embodiment relates to encoding parameters associated with a current layer of a coded video sequence, or bitstream, comprising multiple layers.

According to an embodiment of the invention, the lower layer, or a reference to the lower layer, is predetermined. This is yet a further alternative for indicating a set of parameters which are available for predicting or inferring required parameters for the current layer. Instead of signaling the reference explicitly, the reference is predetermined. Such a predetermined reference may be defined either in an absolute or in a relative manner and must be known to both the encoding and decoding side. For instance, the predetermined reference may always indicate the base layer, or a parameter set associated with the base layer, as reference. Alternatively, the predetermined reference may always indicate the next lower layer, or a parameter set associated with the next lower layer, as reference. In this ways, a set of parameters which are available for predicting or inferring required parameters for the current layer is indicated.

Even though advantages of the invention have in some cases been described with reference to embodiments of the methods according to the first and second aspect of the invention, respectively, corresponding reasoning applies to embodiments of the other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

Figure 1:
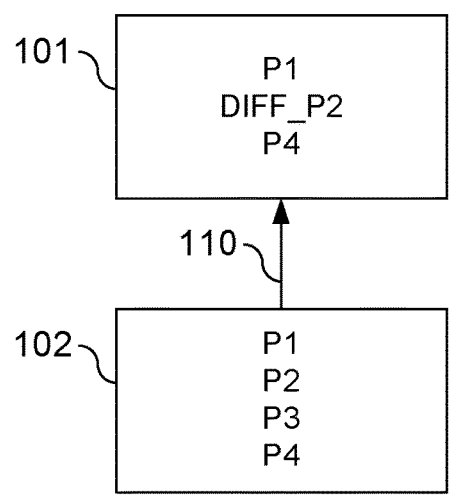
FIG. 1 illustrates prediction between parameter sets, in accordance with an embodiment of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Embodiments of the invention make use of parameter set prediction across layers of multi-layer video representation. To this end, for decoding a current layer, parameters are derived, i.e., predicted or inferred, from a parameter set associated with the current or, preferably, a lower layer. In general, parameters associated with a lower layer are parameters which are used for decoding the lower layer. This is advantageous in that such parameters do not have to be signaled explicitly in the parameter set associated with the current layer, or can be signaled with fewer bits, e.g., by utilizing differential coding. In other words, parameters needed for decoding which are comprised in a parameter set associated with a current layer are predicted or inferred from a parameter set associated with the same or another layer, or predicted or inferred from parameters that are active, i.e., used, for decoding a lower layer, instead of being signaled explicitly.

As an option, instead of completely avoiding signaling parameters explicitly in the parameter set associated with the current layer, the parameters needed in the parameter set associated with the current layer are predicted from another parameter set and/or another layer, and in the parameter set in the current layer, a difference DIFF between the prediction PRED and the actual, required, parameter PARA, e.g., DIFF=PARA−PRED, is signaled. This may require fewer bits for coding than signaling PARA directly if, e.g., VLC is used. The encoder would encode the DIFF signal into the coded parameter set. Subsequently, the decoder could reconstruct the value PARA by deriving the value PRED in the same way as the encoder and calculating PARA, e.g., as PARA=PRED+DIFF.

A further option is that a parameter comprised in a parameter set associated with a lower layer is used for prediction in combination with a predetermined offset. For instance, if the value of a parameter associated with a lower layer parameter set is VAL, then the prediction for the higher layer parameter set could be PRED=VAL+OFFSET, where OFFSET may be a predetermined value, e.g., PRED=VAL+1. Such prediction mechanism is useful for parameters which increase linearly across layers, such as layer identifiers (e.g., view_id, dependency_id, quality_id, and the like).

The proposed parameter set prediction can be applied for reducing the amount of bits required for signaling of all types of parameter sets, including SPS, PPS, APS, VPS, and GPS. When predicting between parameter sets, one option is to predict between parameter sets of the same type, e.g., to predict parameters in SPS from parameters in another SPS. Another option is to use parameters in one type of parameter set to predict parameters in another type of parameter set, e.g., to predict PPS parameters from an SPS, or to predict SPS parameters from a VPS.

Prediction between parameter sets is illustrated in FIG. 1, using example parameters P1, P2, P3, and P4. Note that P1, P2, P3, and P4, as well as similar parameters used for elucidating the invention in subsequent figures, are placeholders for parameters, e.g., numerical values, which may be used for video decoding, such as video picture resolution. To this end, the value of a certain parameter, e.g., P1, may be the same for a lower layer parameter set 102 and a higher layer parameter set 101, or it may be different. One option is that all parameters required for decoding a higher layer are predicted from the lower layer parameter set 102. Another option is that only a subset of the parameters in the lower layer parameter set 102 is used for inference or prediction.

To this end, some parameters may be omitted in the higher layer parameter set 101 if they can be predicted, e.g., P3 in FIG. 1. For other parameters, values indicating a difference may be transmitted in parameter set 101 as described above, such as DIFF_P2 in FIG. 1 which may be used for predicting P2. Note that the arrow 110 in FIG. 1 indicates a direction of prediction.

In this respect, it is noted that the terms "prediction" and "inference" are used synonymously throughout this disclosure, unless otherwise indicated. Further, the term "signaling" may apply to an encoder operation, such as an encoder sending certain information, e.g., in a binary format, according to one or more protocols. It may also apply to a decoder operation, such as a decoder obtaining certain information from a bitstream, which may be formatted in a binary format, and reading and/or interpreting the information according to one or more protocols. The term "signaling" may also apply to the definition of a communication protocol, i.e., the way something is signaled using a certain format, e.g., a binary format, which is known to both a sending and a receiving device, e.g., an encoder and a decoder. Note that the terms "coding" and "signaling" may be used synonymously throughout this disclosure, both being a form of "indicating".

There are several ways for identifying the source of the prediction, referred to as the prediction reference, i.e., from where the parameters in the current layer, or the parameter set associated with the current layer, are predicted. It will be appreciated that encoder and decoder must agree on the way the source of prediction is identified, using either predefined rules, explicit indication/signaling of the source of prediction, or a combination thereof.

Figure 2:
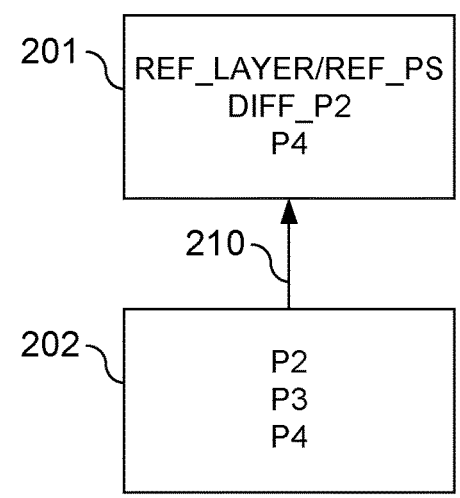
FIG. 2 illustrates indicating a source for prediction, in accordance with an embodiment of the invention.

One alternative is to signal a reference to a layer where the prediction reference can be found, as is illustrated in FIG. 2. In particular, when parameters for a certain parameter set 201 of type xPS, e.g., an SPS, are to be predicted/inferred for a current layer, then a reference to a reference layer can be given (REF_LAYER in FIG. 2), and the active parameter set 202 in that layer may be used as prediction reference. In other words, the active parameters that were signaled in the xPS 202 associated with the reference layer are used as source for prediction/inference (in FIG. 2, the direction of prediction/inference is indicated by arrow 210). Here, a layer could represent a video or depth view (e.g., a multi-view texture+depth 3D video), a spatial layer, a fidelity layer, or the like. Typically, layers are identified by layer identifiers, i.e., syntax elements such as layer_id, layer_id_plus1, view_id, dependency_id, quality_id, or the like, which are positive integer numbers.

For predicting parameters for the current layer CURLAY, a reference layer may be indicated, e.g., in a parameter set 201 associated with CURLAY, using a syntax element that indicates the reference layer REFLAY, such as syntax element REF_LAYER comprised in parameter set 201. This may be done either in an absolute way, e.g., by signaling REFLAY as a VLC code word, or by signaling the difference between CURLAY and REFLAY, e.g., as a VLC code word. Typically, due to the hierarchical layer dependency, CURLAY>REFLAY, and in a preferred embodiment a difference DLAY=CURLAY−REFLAY is signaled as a positive integer >1, or a difference DLAY=CURLAY−REFLAY−1 is signaled which can be coded with commonly used VLC tables that represent positive integer values. At the decoder, REFLAY is identified, e.g., by decoding the VLC as DLAY and obtaining REFLAY as, in this case, REFLAY=CURLAY−DLAY−1.

One advantage of predicting parameters from active parameters associated with a reference layer is error robustness. Due to transmission errors, NAL units carrying parameter set data may get lost. Since the reference layer is likely to be required for the usual video decoding of the current layer, e.g., by means of inter-view or inter-layer pixel prediction, the current layer can only be decoded if the parameter set of the reference layer is available. Thus, if the current layer is decodable otherwise, it is guaranteed, or at least likely, that the parameter set of the reference layer is available, too.

In the decoder, the reference to the reference layer may be resolved at the time of activating the parameter set associated with the current layer for which the prediction/inference is made. It may alternatively, or additionally, be resolved at the time of parsing, i.e., reading and/or interpreting, the parameter set associated with the current layer for which the prediction/inference is made.

Instead of referencing a reference layer, embodiments of the invention may be based on referencing parameter sets. Parameter sets are typically identified by parameter sets identifiers (PS ID), such as seq_parameter_set_id for SPSs. The PS ID may be signaled for referencing a parameter set used for prediction, as is illustrated in FIG. 2 (REF_PS comprised in parameter set 201). Alternatively, a difference between the PS ID for the current parameter set 201 (CURPSID), i.e., the one to predict for, and the PS ID of the referenced parameter set (REFPSID) may be signaled, e.g., DPSID=CURPSID−REFPSID, or alike. Similar to what was described further above, the decoder would obtain REFPSID as REFPSID=CURPSID−DPSID.

Further, a combination of a reference to a layer and a PS ID of a parameter set associated with that layer could be signaled, such as REF_LAYER and REF_PS illustrated in FIG. 2, i.e., one value for identifying the reference layer and another one for identifying the parameter set in the reference layer. This is particularly advantageous if multiple parameter sets are associated with the reference layer. Additionally, the type of parameter set to predict from, e.g., PPS, SPS, APS, or the like, may be signaled by means of a parameter set type indicator.

So far it was assumed that a reference to a reference parameter set to be used for prediction is comprised in a current parameter set for which the prediction is made, e.g., in order to omit signaling of one or several parameters in the current parameter set, or to reduce the number of bits required for the signaling. This is illustrated in FIG. 2, where REF_PS and/or REF_LAYER is signaled in the higher layer parameter set 201 to identify the reference parameter set 202.

Figure 3:
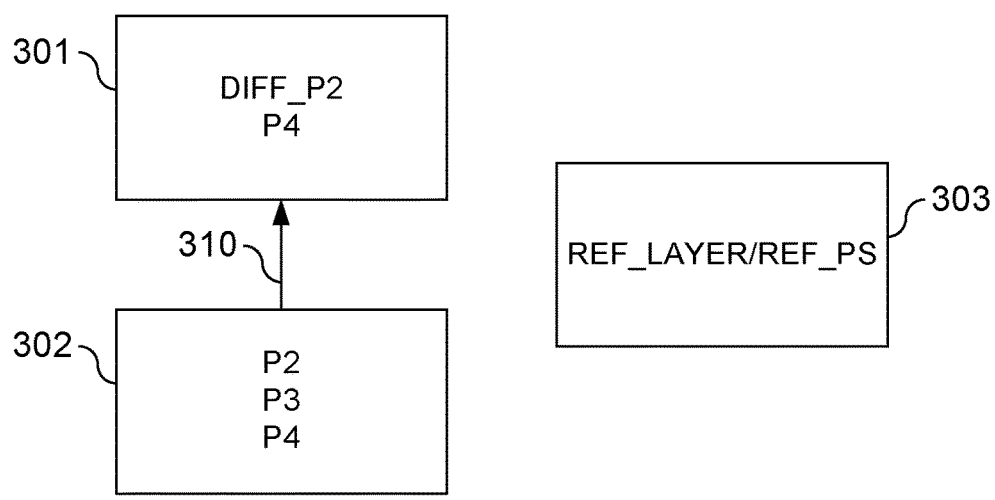
FIG. 3 illustrates indicating a source for prediction, in accordance with an embodiment of the invention.

Alternatively, the reference to a reference layer and/or reference parameter set may be signaled in a separate syntax structure 303, such as a VPS. This is illustrated in FIG. 3, which illustrates predicting/inferring 310 parameters which are associated with a higher layer parameter set 301 from a reference parameter set 302, which is identified by means of a separate syntax structure 303.

As a further alternative, the reference layer or reference parameter set may be predetermined and known to both the encoder and the decoder. For instance, layer 0 could always be used as reference layer, or, given a current layer CURLAY, the next lower layer CURLAY−1 could be used as reference layer. In that case no explicit signaling of the reference is required and further bits can be saved.

For instance, one or several predetermined parameters in layer 0 could be used for prediction/inference for all other layers, or some other layers that have certain properties in common with layer 0 (e.g., the same video picture resolution, or the same type of content, such as video or depth). Further, one or several predetermined parameters in layer CURLAY−1 could be used for prediction/inference in layer CURLAY, e.g., if layers CURLAY−1 and CURLAY have certain common properties. According to those examples, a parameter from a lower layer may thus be implicitly, based on predetermined rules, applied for decoding of a higher layer, and the parameter may thus not have to be transmitted, or transmitted with fewer bits, in a parameter set or other syntax structure in the higher layer, thereby realizing bit savings.

Different methods for referencing, as described hereinbefore, may be applied depending on the type of the current layer, e.g., whether the current layer represents a depth view or video view, or spatial resolution enhancement layer, or a fidelity enhancement layer. Another option is that, for each layer or some layers, both a video view and a depth view exist, and thus a reference layer may contain active PSs for, in this case, both video and depth. Then when a reference is made to a reference layer, if the view currently being decoded is of type depth, the reference could be made to a PS which is active for depth decoding in the reference layer, and if the view currently being decoded is of type texture, the reference could be made to a PS which is active for texture decoding in the reference layer.

The existence of layer references and/or PS references may be conditional with respect to one or several of the following aspects. For instance, the existence of layer references and/or PS references may be conditional on the value of one or several layer identifiers, such as layer_id or layer_id_plus1. These layer identifiers may, e.g., be present in the current PS, in which the reference is conditionally signaled. For instance, if layer_id_plus1==1 in the current PS, the reference may not be present in the current PS, while otherwise it may be present. Thus an encoder could be configured to add a reference to a coded PS if layer_id_plus1!=1, and not add it otherwise. Correspondingly, a decoder could be configured to parse and interpret a reference if layer_id_plus1!=1, and not parse it otherwise. In this way, compatibility with "legacy decoders" which are not configured to parse and interpret the reference may be achieved if those legacy decoders would only be used to decode layers and thus PSs with layer_id_plus1==1.

Another way of providing a "legacy decoder"-compatible PS extension is to provide the reference conditional on the value of profile_idc, i.e., the profile indicator. For profiles that legacy decoders are supposed to decode, the signaling of a layer reference and/or PS reference (that the legacy decoders would not be able to interpret) may be omitted, while for new profiles that legacy decoders are not supposed to decode (and thus they would ignore the data associated with those new profiles), the layer/PS reference could be signaled.

Another, way of controlling the availability of references to layers or PSs is to include a flag, i.e., a single bit, in the PS, indicating for which parameter prediction may be done.

When a reference to a PS or a layer is made by means of one of the methods described above, several parameters may be available to be used for prediction. For instance, when a reference PS has been identified, e.g., by means of a layer reference where the reference PS is the active PS in that layer, either all or some of the parameters in the reference PS may be used for prediction of the parameters in the current PS so that signaling the parameters in the current PS can be omitted or done with fewer bits, whereas otherwise parameters in the current PS may have to be explicitly signaled if not inferred/predicted. That means, based on one or a combination of several mechanisms as given in the following, a subset of parameters that an encoder would encode into a coded higher layer PS, and/or the decoder would parse and interpret from the coded higher layer PS, is determined. Parameters that are not predicted/inferred may be explicitly encoded into the coded higher layer PS by the encoder and parsed and interpreted by the decoder, or they may be omitted (in which case they would not be available at all to the decoder). Using similar mechanisms or combinations thereof, it could be determined which parameters were encoded and/or decoded using differential coding. For example, with reference to FIG. 1, the parameters P1 and P4 are not predicted and instead coded explicitly in the higher layer PS, whereas parameter P2 is coded differentially. Parameter P3 is predicted/inferred from the lower layer PS and it is therefore not explicitly signaled in the higher layer PS.

Figure 4:
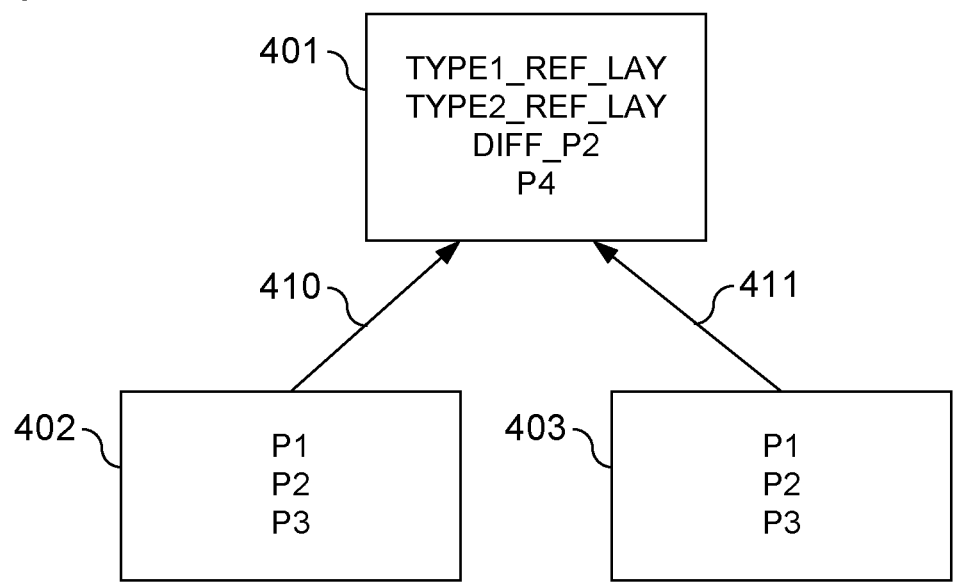
FIG. 4 illustrates indicating a source for prediction, in accordance with an embodiment of the invention.

One way to determine the parameters to be inferred is to use two or more different types of layer references or PS references, e.g., "view reference" and "texture reference" (or "TYPE1_REF_LAY" and "TYPE2_REF_LAY"), as is illustrated in FIG. 4. Both of those reference types could be present in a higher layer PS 401, and depending on the type of reference, different parameters from the respective referenced PS 402 and 403 would be inferred/predicted 410/411. When several different reference types are used, several different layers or PS may be referenced at the same time. A reference type determines the subset of parameters to be used for inference/prediction, and it also determines whether in the higher layer PS 401 (for which the prediction is made), difference parameters are present or not, and which other parameters are present. In FIG. 4, subset 1 may include parameters P1 and P3, which are predicted 410 from the lower layer PS 402 and consequently omitted in higher layer PS 401, and subset 2 may include parameter P2 which is, based on the prediction 411 from the lower layer PS 403, differentially coded in the higher layer PS 401.

Instead of the design illustrated in FIG. 4, where two different reference types are present in the higher layer PS 401, a flexible number (the number may be separately indicated in the higher layer PS or in some other syntax structure) of references may be present, and for each of those references, a reference type may be signaled by means of a reference type indicator.

Another way of indicating which parameters are inferred is that the parameters in the lower layer PS are grouped into one or several groups, or subsets, of parameters, each of which comprises one or several parameters. Then, in a higher layer PS that refers to the lower layer PS, flags or other indicators may be present that indicate which parameter group in the lower layer PS is used for prediction/inference.

Preferably, all parameters which are present in the lower layer PS and not present in the higher layer PS are inferred for the higher layer PS.

When several layer references and/or PS references are present in a higher layer PS, then the parameters to be inferred from each of those references may be determined based on the combination of reference types that are present.

Figure 5:
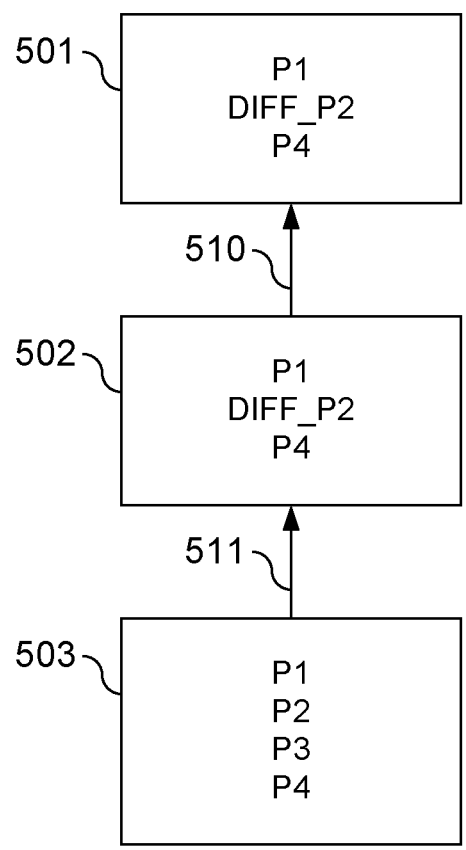
FIG. 5 illustrates chained prediction between parameter sets, in accordance with an embodiment of the invention.

Parameters may also be predicted from PSs for which parameters have been predicted from other reference PSs. Thus prediction chains may be formed, as is illustrated in FIG. 5, which shows a higher layer PS 501 for which at least some parameters are predicted/inferred 510 from a lower layer PS 502, which in turn uses PS 503, associated with an even lower layer, for predicting/inferring 511 at least some of its parameters. This may be combined with other prediction and reference methods, such as illustrated in, and described with reference to, FIGS. 3 and 4.

In the following, embodiments of the methods of deriving parameters required for decoding a current layer of a coded multi-layer video sequence, or bitstream, as well as encoding parameters associated with such a current layer, are described.

Figure 6:
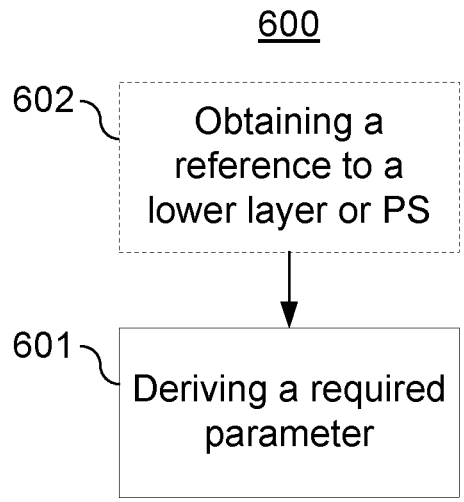
FIG. 6 illustrates a method of deriving parameters required for decoding a current layer of a coded multi-layer video sequence, in accordance with an embodiment of the invention.

In FIG. 6, an embodiment 600 of the method of deriving parameters required for decoding a current layer of a coded multi-layer video sequence is illustrated. The method 600 comprises deriving 601 a required parameter from one or more parameters associated with the current or a lower layer of the multiple layers. The required parameter may be derived 601 from a first parameter associated with a lower layer.

Optionally, the required parameter is derived 601 from a sum of the first parameter and a second parameter associated with the current layer. As an alternative, the required parameter may be derived 601 from a sum of the first parameter and a predetermined second parameter.

A reference to the lower layer may be signaled in, and obtained 602 from, a parameter set associated with the current layer. As an alternative, a reference to a parameter set associated with the lower layer may be signaled in, and obtained 602 from, a parameter set associated with the current layer. As yet a further alternative, the lower layer may be predetermined.

Figure 7:
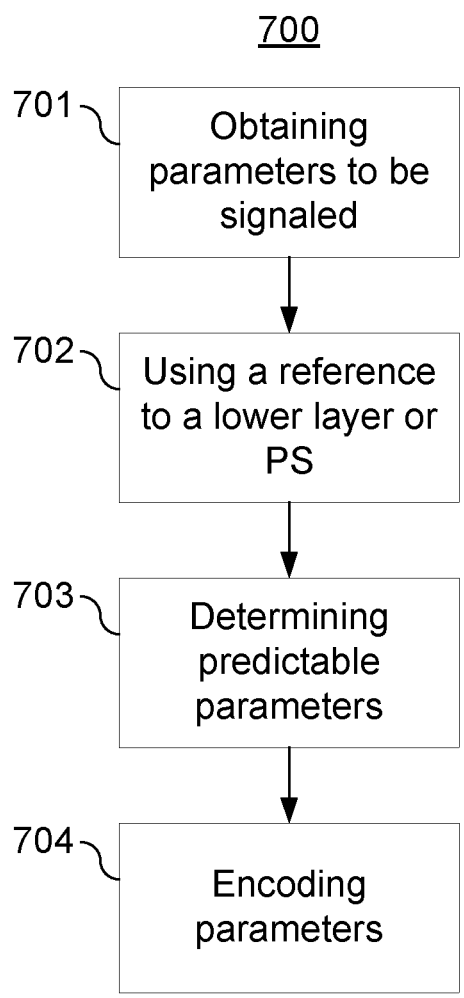
FIG. 7 illustrates method of encoding parameters associated with a current layer of a coded multi-layer video sequence, in accordance with an embodiment of the invention.

In FIG. 7, an embodiment 700 of the method of encoding parameters associated with a current layer of a coded multi-layer video sequence, or bitstream, is illustrated. The method 700 comprises obtaining 701 a plurality of parameters to be signaled in a parameter set associated with the current layer, using 702 a reference to a lower layer of the multiple layers or to a parameter set associated with the lower layer for determining a set of parameters associated with the lower layer, determining 703 one or more of the plurality of parameters to be signaled which are predictable from the set of parameters associated with the lower layer, and encoding 704 the plurality of parameters to be signaled into the parameter set associated with the current layer. In encoding 704 the parameters to be signaled, parameters which are not predictable are signaled explicitly and parameters which are predictable from a first parameter of the set of parameters associated with the lower layer alone are omitted. For parameters which are predictable from a sum of the first parameter and a second parameter, the second parameter is signaled.

Optionally, method 700 further comprises obtaining the reference and encoding the reference into the parameter set associated with the current layer. The reference may be predetermined.

Figure 8:
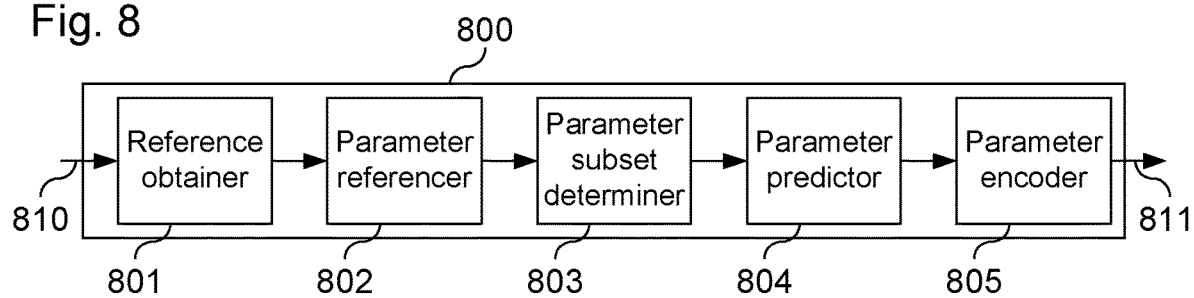
FIG. 8 illustrates a PS encoder, in accordance with an embodiment of the invention.
Figure 9:
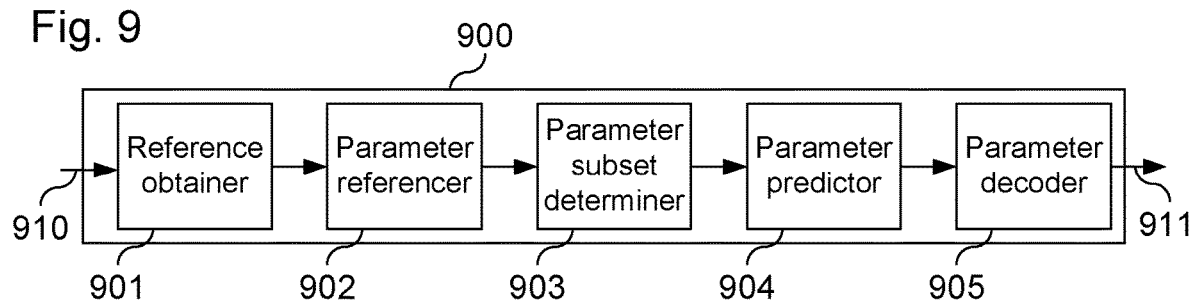
FIG. 9 illustrates a PS decoder, in accordance with an embodiment of the invention.

In accordance with the methods described above, in particular with reference to FIGS. 6 and 7, a PS encoder apparatus 800 is depicted in FIG. 8, and a PS decoder apparatus 900 is depicted in FIG. 9.

In FIG. 8, input 810 to the PS encoder 800 is the parameters to be encoded in a higher layer PS, and output 811 is an encoded PS. First, reference obtainer 801 of the encoder 800 obtains at least one reference to another layer and/or to a parameter set. The reference may be predetermined. Optionally, it encodes the reference into the encoded PS according to one of the methods described above, in particular with reference to FIGS. 2 to 4 and 6. Then, using the obtained reference, the parameters to be available for prediction are determined by parameter referencer 802, e.g., from an active PS in the reference layer. Then, in parameter subset determiner 803, a subset of parameters available for prediction is determined based on one of the methods described above. This may involve encoding subset indicators, or group indicators, into the encoded PS. Then, in parameter predictor 804, the parameters in the subset are used for prediction of the parameters to be encoded. Finally, in parameter encoder 805, the parameters are encoded by explicitly coding some of them, omitting some of the predicted parameters, and applying differential coding for some of the predicted parameters, as is described hereinbefore. The output 811 is the encoded parameters.

In FIG. 9, the PS decoder 900 performs the inverse operation with respect to the PS encoder 800, described with reference to FIG. 8. To this end, input 910 is the encoded parameters, and output 911 is the decoded parameters. First, a reference obtainer 901 of the decoder 900 obtains at least one reference to another layer and/or parameter set. The reference may be predetermined. For obtaining at least one reference, the decoder 900 may parse and interpret the reference from the encoded PS. Then, in parameter referencer 902, the parameters to be available for prediction are determined using the obtained reference, e.g., from an active PS in the referenced layer. Then, in parameter subset determiner 903, a subset, or group, of parameters is determined based on one of the methods described above and the parameters available for prediction. Determining a parameter subset may involve decoding subset indicators from the encoded PS. Then, in parameter predictor 904, the parameters in the subset are used for prediction of the parameters to be decoded. Finally, in parameter decoder 905, the parameters are decoded, by potentially inverting some of the encoding methods used in the parameter encoder, e.g., decoding of differentially encoded parameters. The output 911 is the decoded parameters.

Figure 10:
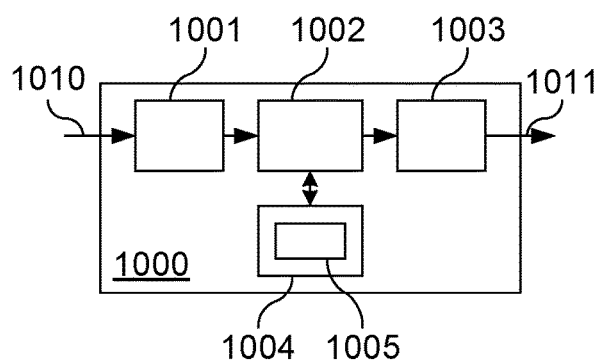
FIG. 10 illustrates a PS encoder, in accordance with an embodiment of the invention.

In FIG. 10, an alternative embodiment 1000 of a PS encoder is illustrated. The encoder 1000 comprises at least an input section 1001, an output section 1003, a processor 1002, and a memory 1004.

The encoder receives a video sequence 1010, i.e., a sequence of pictures, via the input section 1001, and the processor 1002 is configured to perform the procedures described hereinabove, in particular as described with reference to FIG. 8. The output section 1003 may provide the resulting bitstream 1011 for further processing or transport over a communications network. The functionality of the processor 1003 may be realized by a computer program 1005 stored in the memory 1004. The computer program 1005 comprises computer program code which is adapted, when executed on the processor 1002, to implement the procedures described hereinabove.

An embodiment of the computer program 1005 may be provided as a computer program product comprising a computer readable storage medium, which has the computer program 1005 embodied therein. The computer readable storage medium may, e.g., be memory 1004, a memory stick, or any other type of data carrier. It will also be appreciated that an embodiment of the computer program 1005 may be provided by means of downloading the computer program over a communication network.

Figure 11:
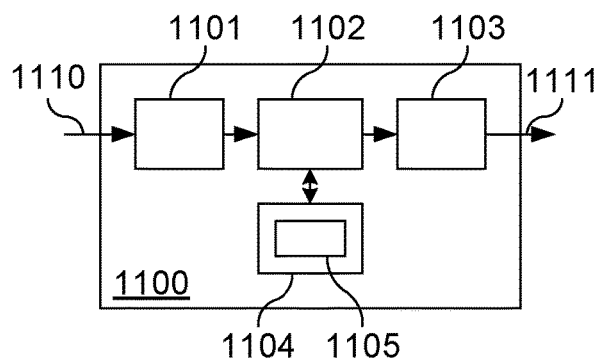
FIG. 11 illustrates a PS decoder, in accordance with an embodiment of the invention.

In FIG. 11, an alternative embodiment 1100 of a PS decoder is illustrated. The decoder 1100 comprises at least an input section 1101, an output section 1103, a processor 1102, and a memory 1104.

The decoder 1100 receives a coded video sequence, i.e., a bitstream, 1110 via the input section 1101, and the processor 1102 is configured to perform the procedures described hereinabove, in particular as described with reference to FIG. 9. The output section 1103 provides the video 1111 for further processing, e.g., displaying. The functionality of the processor 1102 may be realized by a computer program 1105 stored in the memory 1104. The computer program 1105 comprises computer program code which is adapted, when executed on the processor 1102, to implement the procedures described hereinabove.

An embodiment of the computer program 1105 may be provided as a computer program product comprising a computer readable storage medium, which has the computer program 1105 embodied therein. The computer readable storage medium may, e.g., be memory 1104, a memory stick, or any other type of data carrier. It will also be appreciated that an embodiment of the computer program 1105 may be provided by means of downloading the computer program over a communication network.

It will be appreciated that embodiments of the PS encoder and PS decoder described with reference to FIGS. 8 to 11 may be comprised in a video encoder or decoder, respectively.

As described in the following, the methods and apparatuses disclosed above can be used for providing signaling of additional PS parameters for lower layers while guaranteeing compatibility with legacy decoders that cannot interpret the new PS parameters. For instance, consider a single-layer legacy decoder which can decode compressed video including PSs according to the single-layer decoding specification. Now an extension to the single-layer decoding specification is made, extending it into a multi-layer decoding specification, e.g., using two layers. The second layer may be a second video view, whereas the first layer represents a first video view, so that the two-layer configuration represents a stereoscopic 3D video. The first layer has an associated layer identifier, e.g., layer_id_plus1=1, and the second layer has an associated layer identifier layer_id_plus1=3. Some of the PSs associated with layer_id_plus1=3 carry information that is unique for the stereoscopic 3D video, e.g., a parameter view_id that is valid for the video view associated with layer_id_plus1=3. The view_id parameter cannot simply be included in any PS associated with layer_id_plus1=1, since that would break compatibility with the legacy decoder given that it cannot interpret that value. However it may be required to associate a value of view_id with the first video view. As a solution, an additional PS is introduced with layer_id_plus1=2. By using one of the methods above, the PS with layer_id_plus1=2 references a PS with layer_id_plus1=1, thus associating the two PSs. Note that the two PSs may also be associated by additional or alternative means, e.g., by using the same value of PS ID for both of them. The PS with layer_id_plus1 carries the parameter view_id, and it may predict all other parameters by means of its PS reference.

The legacy decoder would only decode the video view associated with layer_id_plus1=1, thus ignoring the additional video view associated with layer_id_plus1=3 as well as the additional PS associated with layer_id_plus1=2. A new decoder capable of performing extended decoding would decode both the video view associated with layer_id_plus1=1 and the video view associated with layer_id_plus1=3. Additionally, it would interpret the additional PS associated with layer_id_plus1=2. As part of the decoding process, while decoding a PS associated with layer_id_plus1=1, the association with the additional PS associated with layer_id_plus1=2 would be understood and utilized and that additional PS be activated, so that the additional parameter in that PS (view_id) could be utilized.

The above-described methods for indicating layer references and/or PS references can additionally, or alternatively, be used for indicating decoding dependencies from the encoder to the decoder. For instance, if in a PS associated with a higher layer a reference to a lower layer is present, a decoder may conclude that a decoding dependency with respect to the lower layer is present, and utilize the decoding dependency information in the further decoding process, e.g., for inter-layer reference picture list management.

Another option is that layer references and/or PS references are present, e.g., in a higher layer PS, and their application for PS prediction/inference and/or decoding dependency indication is determined based on additional reference application indicators. The decoder would then be configured to parse both layer reference and/or PS reference and reference application indicators, and based on the value of the reference application indicator, perform PS prediction and/or utilize the reference information to determine decoding dependency information.

The person skilled in the art realizes that the invention by no means is limited to the embodiments described above. On the contrary, many modifications and variations are possible within the scope of the appended claims.

The invention claimed is:

1. A method of deriving parameters required for decoding a current layer of a video bitstream comprising multiple layers, the method comprising:
   obtaining, from a current layer parameter set associated with decoding the current layer of the video bitstream, a reference to a lower layer parameter set associated with decoding a lower layer of the multiple layers of the video bitstream, wherein the reference to the lower layer parameter set is signaled in the current layer parameter set;
   responsive to obtaining the reference to the lower layer parameter set from the current layer parameter set, deriving a parameter required for decoding the current layer from a parameter of the lower layer parameter set, wherein the parameter required for decoding the current layer is not signaled explicitly but is predicted from the parameter of the lower layer parameter set used for decoding the lower layer,
   wherein the reference comprises a parameter type identifier of the lower layer parameter set;
   wherein the lower layer parameter set is one of several different parameter sets of the lower layer; and
   wherein deriving the parameter required for decoding the current layer comprises selecting the lower layer parameter set from the several different parameter sets of the lower layer based on the parameter type identifier.

2. The method according to claim 1, wherein the parameter required for decoding the current layer is derived from a sum of a first parameter of the lower layer parameter set and a second parameter of the current layer parameter set.

3. The method according to claim 1, wherein the parameter required for decoding the current layer is derived from a sum of a first parameter of the lower layer parameter set and a predetermined second parameter.

4. The method according to claim 1, wherein the parameter of the lower layer parameter set comprises a predetermined parameter value.

5. A computer program product comprising a non-transitory computer readable storage medium storing computer program code, the computer program code being adapted, when executed on a processor, to implement the method according to claim 1.

6. A method of encoding parameters associated with a current layer of a video bitstream comprising multiple layers, the method comprising:
- obtaining a plurality of parameters to be signaled in a current layer parameter set of the current layer of the video bitstream,
- obtaining a reference to a lower layer parameter set of the multiple layers of the video bitstream;
- determining a lower layer parameter set of the lower layer of the video bitstream based on the reference,
- determining one or more of the plurality of parameters to be signaled in the current layer parameter set are predictable from one or more parameters of the lower layer parameter set of the lower layer of the video bitstream,
- encoding the reference to the lower layer parameter set into the current layer parameter set of the current layer of the video bitstream while omitting the one or more of the plurality of parameters to be signaled in the current layer parameter set which are predictable from one or more parameters of the lower layer parameter set,
- determining one or more of the plurality of parameters to be signaled in the current layer parameter set that are not predictable from the one or more parameters of the lower layer parameter set of the lower layer of the video bitstream,
- encoding the one or more of the plurality of parameters to be signaled that are not predictable from the one or more parameters of the lower layer parameter set into the current layer parameter set of the current layer of the video bitstream,
- signaling the current layer parameter set of the current layer comprising the reference to the lower layer parameter set and the one or more of the plurality of parameters that are not predictable from the one or more parameters of the lower layer parameter set in the video bitstream,
- wherein the lower layer parameter set is one of several different parameter sets of the lower layer, and
- wherein deriving the parameter required for decoding the current layer comprises selecting the lower layer parameter set from the several different parameter sets of the lower layer based on a parameter type identifier of the lower layer parameter set.

7. The method according to claim 6, wherein the reference comprises a layer identifier of the lower layer and a parameter set identifier of the lower layer parameter set.

8. A computer program product comprising a non-transitory computer readable storage medium storing computer program code, the computer program code being adapted, when executed on a processor, to implement the method according to claim 6.

9. A parameter set decoder for deriving parameters required for decoding a current layer of a video bitstream comprising multiple layers, the decoder comprising a processor that is configured to perform operations comprising:
- obtaining, from a current layer parameter set associated with decoding the current layer of the video bitstream, a reference to a lower layer parameter set associated with decoding a lower layer of the multiple layers of the video bitstream, wherein the reference to the lower layer parameter set is signaled in the current layer parameter set; and
- responsive to obtaining the reference to the lower layer parameter set from the current layer parameter set, deriving a parameter required for decoding the current layer from a parameter of the lower layer parameter set, wherein the parameter required for decoding the current layer is not signaled explicitly but is predicted from the parameter of the lower layer parameter set used for decoding the lower layer,
- wherein the reference comprises a parameter type identifier of the lower layer parameter set;
- wherein the lower layer parameter set is one of several different parameter sets of the lower layer; and
- wherein deriving the parameter required for decoding the current layer comprises selecting the lower layer parameter set from the several different parameter sets of the lower layer based on the parameter type identifier.

10. The parameter set decoder according to claim 9, wherein the parameter required for decoding the current layer is derived from a sum of a first parameter of the lower layer parameter set and a second parameter of the current layer parameter set.

11. The parameter set decoder according to claim 9, wherein the parameter required for decoding the current layer is derived from a sum of a first parameter of the lower layer parameter set and a predetermined second parameter.

12. The parameter set decoder according to claim 9, wherein the parameter of the lower layer parameter set comprises a predetermined parameter value.

13. A video decoder comprising a parameter set decoder according to claim 9.

14. A parameter set encoder for encoding parameters associated with a current layer of a video bitstream comprising multiple layers, the encoder comprising a processor that is configured to perform operations comprising:
- obtaining a plurality of parameters to be signaled in a current layer parameter set of the current layer of the video bitstream,
- obtaining a reference to a lower layer parameter set of the multiple layers of the video bitstream;
- determining a lower layer parameter set of the lower layer of the video bitstream based on the reference,
- determining one or more of the plurality of parameters to be signaled in the current layer parameter set are predictable from one or more parameters of the lower layer parameter set of the lower layer of the video bitstream,
- encoding the reference to the lower layer parameter set into the current layer parameter set of the current layer of the video bitstream while omitting the one or more of the plurality of parameters to be signaled in the current layer parameter set which are predictable from one or more parameters of the lower layer parameter set,
- determining one or more of the plurality of parameters to be signaled in the current layer parameter set that are not predictable from the one or more parameters of the lower layer parameter set of the lower layer of the video bitstream,
- encoding the one or more of the plurality of parameters to be signaled that are not predictable from the one or more parameters of the lower layer parameter set into the current layer parameter set of the current layer of the video bitstream, and
- signaling the current layer parameter set of the current layer comprising the reference to the lower layer parameter set and the one or more of the plurality of parameters that are not predictable from the one or more parameters of the lower layer parameter set in the video bitstream, wherein the lower layer parameter set is one of several different parameter sets of the lower layer, and wherein deriving the parameter required for decoding the current layer comprises selecting the lower layer parameter set from the several different parameter sets of the lower layer based on a parameter type identifier of the lower layer parameter set.

15. The parameter set encoder according to claim 14, wherein the reference comprises a layer identifier of the lower layer and a parameter set identifier of the lower layer parameter set.

16. A video encoder comprising a parameter set encoder according to claim 14.

17. The method according to claim 1, wherein deriving a parameter required for decoding the current layer from the parameter of the lower layer parameter set comprises deriving the parameter required for decoding the current layer from a parameter of the lower layer which is active for the referenced lower layer when a flag is present in the parameter set associated with the current layer, the flag identifying which parameter active in the referenced lower layer parameter set should be used for deriving the parameter required for decoding the current layer.

18. The method according to claim 1, further comprising: determining parameters required for decoding the current layer that can be derived from an active parameter set of the referenced lower layer based on the determined reference.

19. The method according to claim 6, wherein signaling the current layer parameter set further comprises including a flag into the signaled current layer parameter set indicating which parameters of the signaled current layer parameter set are predictable from the signaled reference to the lower layer parameter set.

20. The method according to claim 1, wherein the reference comprises a layer identifier of the lower layer and a parameter set identifier of the lower layer parameter set.

* * * * *

UNITED STATES PATENT AND TRADEMARK OFFICE
CERTIFICATE OF CORRECTION

PATENT NO. : 10,609,394 B2
APPLICATION NO. : 14/395563
DATED : March 31, 2020
INVENTOR(S) : Thomas Rusert Page 1 of 1

It is certified that error appears in the above-identified patent and that said Letters Patent is hereby corrected as shown below:

In the Specification

In Column 14, Line 46, delete "processor 1003" and insert -- processor 1002 --, therefor.

In the Claims

In Column 17, Line 8, in Claim 6, delete "bitstream;" and insert -- bitstream, --, therefor.

In Column 18, Line 37, in Claim 14, delete "bitstream;" and insert -- bitstream, --, therefor.

Signed and Sealed this
Ninth Day of June, 2020

Andrei Iancu
*Director of the United States Patent and Trademark Office*